US012774527B2

(12) United States Patent
Peng

(10) Patent No.: US 12,774,527 B2
(45) Date of Patent: Oct. 27, 2026

(54) COATING DEVICE AND COATING METHOD

(71) Applicant: CONTEMPORARY AMPEREX TECHNOLOGY (HONG KONG) LIMITED, Hong Kong (CN)

(72) Inventor: Zhuo Peng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/896,979

(22) Filed: Sep. 26, 2024

(65) Prior Publication Data

US 2025/0019834 A1 Jan. 16, 2025

Related U.S. Application Data

(63) Continuation of application No. PCT/CN2022/119686, filed on Sep. 19, 2022.

(51) Int. Cl.

| | |
|---|---|
| ***C23C 24/10*** | (2006.01) |
| ***H01M 50/119*** | (2021.01) |
| ***H01M 50/121*** | (2021.01) |
| ***H01M 50/124*** | (2021.01) |

(52) U.S. Cl.

CPC ........... *C23C 24/10* (2013.01); *H01M 50/119* (2021.01); *H01M 50/121* (2021.01); *H01M 50/1245* (2021.01)

(58) Field of Classification Search

USPC ........ 118/428, 429, 303, 302, 308, 423–425, 118/417, 58, 64

See application file for complete search history.

(56) References Cited

U.S. PATENT DOCUMENTS

| | | | | |
|---|---|---|---|---|
| 3,875,898 A * | 4/1975 | Braden | .................. | B05C 19/02 118/421 |
| 2022/0395856 A1* | 12/2022 | Matsumoto | ............. | B05C 19/02 |

FOREIGN PATENT DOCUMENTS

| | | |
|---|---|---|
| CN | 105642513 A | 6/2016 |
| CN | 109004353 A | 6/2019 |
| CN | 210497080 U | 5/2020 |
| CN | 112736330 A | 4/2021 |
| CN | 112934641 A | 6/2021 |
| CN | 213558167 U | 6/2021 |
| DE | 2837282 A1 | 3/1980 |
| GB | 833181 A | 4/1960 |
| KR | 20190076135 A | 7/2019 |

OTHER PUBLICATIONS

English Translation CN-213558167 U (Year: 2021).*
International Search Report and Written Opinion mailed on May 23, 2023, received for International Application No. PCT/CN2022/119686, filed on Sep. 19, 2022, 15 pages including English Translation.

* cited by examiner

*Primary Examiner* — Yewebdar T Tadesse
(74) *Attorney, Agent, or Firm* — XSENSUS LLP

(57) ABSTRACT

Disclosed are a coating device and a coating method. The coating device includes: a fluidization tank for containing a dip-coating powder therein; a clamp for clamping a battery case and dipping the battery case in the dip-coating powder in the fluidization tank; and a first heating mechanism for heating the battery case so that the dip-coating powder around the battery case is melted and adhered to the surface of the battery case to form an insulating film.

11 Claims, 8 Drawing Sheets

COATING DEVICE AND COATING METHOD

CROSS-REFERENCE TO RELATED APPLICATION

This application is a continuation of International Application No. PCT/CN2022/119686, filed on Sep. 19, 2022, which is hereby incorporated by reference in its entirety.

TECHNICAL FIELD

The present application relates to the technical field of batteries, and more particularly to a coating device and coating method.

BACKGROUND

With energy saving and emission reduction being the key to the sustainable development of automobile industry, electric vehicles have become an important part of the sustainable development of automotive industry due to their advantages of energy saving and environmental protection. For electric vehicles, battery technology is an important factor related to their development.

In the development of battery technology, it is an urgent technical problem to be solved to improve the production efficiency and quality of batteries.

SUMMARY OF THE INVENTION

The present application provides a coating device and a coating method that can improve the production efficiency and quality of batteries.

The present application is implemented through the following technical solutions.

In a first aspect, the present application provides a coating device, including: a fluidization tank for containing dip-coating powder therein; a clamp for clamping a battery case and dipping the battery case in the dip-coating powder in the fluidization tank; and a first heating mechanism for heating the battery case so that the dip-coating powder around the battery case is melted and adhered to the surface of the battery case to form an insulating film.

In the above solution, a coating device is used to achieve coating of the battery case through the dip coating process: the first heating mechanism is used to heat the battery case so that the surface of the battery case has a higher temperature; the clamp is used to clamp the battery case and allow the battery case to enter the dip-coating powder in the fluidization tank; the battery case with a high-temperature surface causes the dip-coating powder around it to melt, and the melted dip-coating powder adheres to the surface of the battery case to form an insulating film. The solution of using a coating device to achieve coating by dip coating can solve the quality problems of bubbles, wrinkles and peeling of the insulating film caused by enveloping (the insulating film is enveloped on the surface of the battery case through an adhesive) as well as the problem of low production efficiency, and lead to higher production efficiency and quality of the battery case, which in turn leads to higher production efficiency and quality of the battery.

According to some embodiments of the present application, the clamp includes a mounting plate and a clamping portion, the clamping portion is connected to the mounting plate and is used to clamp the battery case; and the mounting plate is configured to cover the opening of the fluidization tank.

In the above solution, the clamp has a simple structure and is easy to manufacture. The clamping portion is used to clamp the battery case to realize fixation of the battery case, and then the clamp can realize movement of the battery case. The mounting plate is connected to the clamping portion. When the battery case enters the fluidization tank, the mounting plate can cover the opening of the fluidization tank to avoid leakage of the dip-coating powder in the fluidization tank and ensure the safety of the operating environment.

According to some embodiments of the present application, the clamping portion has a sealing member for sealing the opening of the battery case.

In the above solution, the sealing member is provided so that the opening of the battery case can be sealed while the clamping portion is clamping the battery case, thereby preventing the dip-coating powder from entering the interior of the battery case through the opening of the battery case, ensuring the quality of the coating on the surface of the battery case.

According to some embodiments of the present application, the clamp includes a plurality of clamping portions for clamping a plurality of battery cases, and the plurality of clamping portions are connected to the mounting plate.

Among the above solutions, in contrast to the solutions of enveloping or spraying (using the electrostatic powder spraying method to coat the battery case), if the dip coating process is used to coat the battery case, the battery case can be coated in batches. Therefore, a plurality of clamping portions are provided to clamp a plurality of battery cases simultaneously, and consequently the plurality of battery cases can be dip-coated simultaneously, thereby improving the efficiency of battery case coating and improving the efficiency of battery manufacturing.

According to some embodiments of the present application, the clamp further includes a vibrating portion provided on the mounting plate for vibrating the clamping portion.

In the above solution, by providing the vibrating portion, the battery case clamped by the clamping portion can be vibrated, thereby making the dip-coating powder adhered to the surface of the battery case more uniform, so that the battery case has good coating quality, leading to higher quality of the battery.

According to some embodiments of the present application, the fluidization tank has an air inlet for introducing gas into the interior of the fluidization tank, so that the dip-coating powder is in a fluidized state.

In the above solution, by providing the air inlet, gas can be introduced into the interior of the fluidization tank, so that the dip-coating powder is in a fluidized state in the fluidization tank, thereby improving the uniformity of the dip-coating powder adhered to the surface of the battery case.

According to some embodiments of the present application, a partition is provided inside the fluidization tank. The partition divides the interior of the fluidization tank into a first chamber and a second chamber along the height direction of the fluidization tank. The partition has a plurality of through holes to communicate the first chamber with the second chamber, the diameter of the through holes being less than or equal to the diameter of the dip-coating powder. The air inlet is in communication with the first chamber, and the second chamber is filled with the dip-coating powder.

In the above solution, by providing the partition, on the one hand, the uniformity of the gas introduced into the second chamber can be improved, the fluidity of the dip-coating powder can be improved, and consequently the uniformity of adhesion to the surface of the battery case can be improved; on the other hand, as the diameter of the through holes is less than or equal to the diameter of the dip-coating powder, the dip-coating powder can be prevented from pouring back and blocking the air inlet.

According to some embodiments of the present application, the first heating mechanism is located outside the fluidization tank for preheating the battery case before it is dipped in the dip-coating powder.

In the above solution, the first heating mechanism is used to preheat the battery case, that is, to heat the battery case before it is dipped in the dip-coating powder.

According to some embodiments of the present application, the first heating mechanism is located inside the fluidization tank to heat the battery case after it is dipped in the dip-coating powder.

In the above solution, the first heating mechanism is arranged inside the fluidization tank, so that it can heat the battery case after it is dipped in the dip-coating powder. Therefore, compared with the solution of preheating the battery case, heat loss of the battery case during its movement from the first heating mechanism to the fluidization tank can be avoided, so that the battery case can be heated with less energy, thereby saving energy.

According to some embodiments of the present application, the first heating mechanism is a first electromagnetic induction coil.

In the above solution, the battery case is heated by the first electromagnetic induction coil, which can heat the battery case effectively and accurately, so that the surface of the battery case is at a suitable temperature to melt the dip-coating powder around the battery case effectively, and consequently the thickness of the insulating film on the surface of the battery case can be accurately controlled, so that the battery has higher quality.

According to some embodiments of the present application, the first electromagnetic induction coil encloses a first cavity for accommodating the battery case.

In the above solution, the first electromagnetic induction coil encloses a first cavity for accommodating the battery case to heat any position on the surface of the battery case effectively, so that the surface of the battery case is at a suitable temperature to melt the dip-coating powder around the battery case effectively, and consequently the thickness of the insulating film on the surface of the battery case can be accurately controlled, so that the battery has higher quality.

According to some embodiments of the present application, the coating device further includes a second heating mechanism for heating the battery case having its surface covered with an insulating film to melt the insulating film so as to make the surface of the insulating film uniform.

In the above solution, the battery case with the adhered insulating film is removed from the fluidization tank, and through heating by the second heating mechanism, the dip-coating powder adhered to the surface of the battery case can be melted, making the insulating film on the surface of the battery case more uniform.

According to some embodiments of the present application, the coating device further includes: a plasticizing tank, the second heating mechanism being provided in the plasticizing tank; the clamp further being used to place the battery case in the plasticizing tank.

In the above solution, the second heating mechanism is provided in the plasticizing tank, and can effectively heat the surface of the battery case, thereby making the insulating film on the surface of the battery case more uniform.

According to some embodiments of the present application, the second heating mechanism is a second electromagnetic induction coil.

In the above solution, the battery case is heated by the second electromagnetic induction coil, which can heat the battery case effectively and accurately, so that the surface of the battery case is at a suitable plasticizing temperature to melt the dip-coating powder on the surface of the battery case effectively, and consequently the thickness of the insulating film on the surface of the battery case can be accurately controlled, so that the battery has higher quality.

According to some embodiments of the present application, the second electromagnetic induction coil encloses a second cavity for accommodating the battery case.

In the above solution, the second electromagnetic induction coil encloses a second cavity for accommodating the battery case to heat any position on the surface of the battery case effectively and accurately, so that the surface of the battery case is at a suitable plasticizing temperature to melt the dip-coating powder on the surface of the battery case effectively, and consequently the thickness of the insulating film on the surface of the battery case can be accurately controlled, so that the battery has higher quality.

In a second aspect, the present application further provides a coating method, including the steps of:

preheating a battery case; and dipping the preheated battery case in the dip-coating powder, melting the dip-coating powder around the battery case by the residual heat of the battery case and adhering it to the surface of the battery case to form an insulating film.

In the above solution, the surface of the battery case is coated by dip coating, which, compared with the solution of coating the surface of the battery case by enveloping, has the advantages of strong adhesion and absence of bubbles and wrinkles of the insulating film, and can effectively improve the battery quality.

According to some embodiments of the present application, in preheating the battery case:

the preheating temperature for the battery case is M1, and the melting point of the dip-coating powder is M2, where 20° C.≤M1−M2≤50° C.

In the above solution, since the battery case is heated by means of preheating, the heat loss during movement from the preheating position to the dip-coating powder position needs to be considered. If the difference between the preheating temperature and the melting point temperature M2 of the dip-coating powder is less than 20° C., it will cause the problem of incapability of melting the dip-coating powder. If the difference between the preheating temperature and the melting point temperature M2 of the dip-coating powder is greater than 50° C., however, it will cause the problem of excessively thick insulating film on the surface of the battery case, causing poor quality of the coating. Therefore, in this solution, the preheating temperature M1 is limited so that the preheating temperature M1 satisfies the condition 20° C.≤M1−M2≤50° C., so that the insulating film can be adhered to the surface of the battery case and the insulating film has a suitable thickness.

According to some embodiments of the present application, the dipping the preheated battery case in the dip-coating powder includes: dipping the preheated battery case in the dip-coating powder, and vibrating the battery case.

In the above solution, while the preheated battery case is dipped in the dip-coating powder, the battery case is vibrated so that the dip-coating powder that is melted and adhered to the surface of the battery case is uniformly distributed, thereby improving the uniformity of the insulating film.

According to some embodiments of the present application, after the step of dipping the preheated battery case in the dip-coating powder, the method further includes: removing the battery case from the dip-coating powder, heating the battery case again to melt the insulating film adhered to the surface of the battery case to make the surface of the insulating film uniform.

In the above solution, by removing the battery case from the dip-coating powder and heating the battery case again to achieve heating and plasticizing, the insulating film on the surface of the battery case can be made more uniform, and the coating quality of the battery case can be better, so that the battery has higher quality.

According to some embodiments of the present application, the removing the battery case from the dip-coating powder and heating the battery case again includes: removing the battery case from the dip-coating powder, and heating the battery case again while vibrating the battery case.

In the above solution, during heating and plasticizing, vibrating the battery case can make the insulating film more uniform, thereby effectively improving the quality of the battery.

According to some embodiments of the present application, the preheating the battery case includes preheating a plurality of battery cases simultaneously; the dipping the preheated battery case in the dip-coating powder includes dipping the plurality of battery cases in the dip-coating powder simultaneously; and the removing the battery case from the dip-coating powder and heating the battery case again includes removing the plurality of battery cases from the dip-coating powder simultaneously and heating the plurality of battery cases simultaneously again.

In the above solution, since the coating of the surface of the battery case is achieved by using the dip coating process, a plurality of battery cases can be coated simultaneously, thereby improving the efficiency of battery case coating and improving the efficiency of battery manufacturing.

In a third aspect, the present application further provides a coating method, including the steps of:

dipping a battery case in dip-coating powder; and heating the battery case so that the dip-coating powder around the battery case is melted and adhered to the surface of the battery case to form an insulating film.

In the above solution, in contrast to preheating the battery case, in this solution, the battery case is heated after being dipped in the dip-coating powder, which can effectively avoid heat loss during movement of the battery case and increase energy utilization, and the battery case is enabled to effectively melt the dip-coating powder around it, ensuring the effective formation of the insulating film.

According to some embodiments of the present application, the heating the battery case includes:

heating the battery case while vibrating the battery case.

In the above solution, while the dip-coating powder is melted and adhered to the surface of the battery case, the battery case is vibrated so that the dip-coating powder adhered to the surface of the battery case is uniformly distributed, thereby improving the uniformity of the insulating film.

According to some embodiments of the present application, in heating the battery case: the heating temperature for the battery case is M3, a melting point of the dip-coating powder is M2, where 5° C.≤M3−M2≤50° C.

In the above solution, since the battery case is heated in the dip-coating powder, substantial heat loss can be avoided. Compared with the preheating solution, the heating temperature for the battery case can be lowered. If the difference between the heating temperature and the melting point temperature M2 of the dip-coating powder is less than 5° C., it will cause the problem of incapability of melting the dip-coating powder. If the difference between the heating temperature and the melting point temperature M2 of the dip-coating powder is greater than 50° C., however, it will cause the problem of excessively thick insulating film on the surface of the battery case, causing poor quality of the coating. Therefore, in this solution, the heating temperature M3 is limited so that the heating temperature M3 satisfies the condition 5° C.≤M3−M2≤50° C., so that the insulating film can be adhered to the surface of the battery case and the insulating film has a suitable thickness.

According to some embodiments of the present application, the heating the battery case includes:

heating the battery case by a first electromagnetic induction coil.

In the above solution, the first electromagnetic induction coil is used to heat the battery case. On the one hand, the dip-coating powder will not be heated, ensuring that the battery case can be coated smoothly and effectively. On the other hand, the charge passing through the first electromagnetic induction coil can be controlled to control its heating power, and consequently accurately control the temperature of the surface of the battery case, so that the insulating film on the battery surface has better quality, and consequently the battery has higher quality.

According to some embodiments of the present application, after the step of heating the battery case, the method further includes: removing the battery case from the dip-coating powder, heating the battery case again to melt the insulating film adhered to the surface of the battery case to make the surface of the insulating film uniform.

In the above solution, by removing the battery case from the dip-coating powder and heating the battery case again to achieve heating and plasticizing, the insulating film on the surface of the battery case can be made more uniform, and the coating quality of the battery case can be better, so that the battery has higher quality.

According to some embodiments of the present application, the removing the battery case from the dip-coating powder and heating the battery case again includes: removing the battery case from the dip-coating powder, and heating the battery case again while vibrating the battery case.

In the above solution, during heating and plasticizing, vibrating the battery case can make the insulating film more uniform, thereby effectively improving the quality of the battery.

According to some embodiments of the present application, in removing the battery case from the dip-coating powder and heating the battery case again to melt the insulating film adhered to the surface of the battery case: the heating temperature is M4, and the melting point of the dip-coating powder is M2, where 20° C.≤M4−M2≤100° C.

In the above solution, in the process of plasticizing the battery case, if the difference between the heating temperature M4 and the melting point M2 of the dip-coating powder is too low, it will not be easy to melt the dip-coating powder on the surface of the battery case. If the difference between the heating temperature M4 and the melting point M2 of the dip-coating powder is too high, however, it will affect the forming quality of the insulating film and easily cause the insulating film to crack. In view of this, the heating temperature M4 is limited in this solution to satisfy the condition 20° C.≤M4−M2≤100° C., ensuring smooth melting of the dip-coating powder on the surface of the battery case to ensure the quality of the insulating film of the battery case.

According to some embodiments of the present application, the dipping the battery case in the dip-coating powder includes dipping a plurality of battery cases in the dip-coating powder simultaneously;

the heating the battery case includes heating the plurality of battery cases simultaneously; and the removing the battery case from the dip-coating powder and heating the battery case again includes: removing the plurality of battery cases from the dip-coating powder simultaneously and heating the plurality of battery cases simultaneously again.

In the above solution, since the coating of the surface of the battery case is achieved by using the dip coating process, a plurality of battery cases can be coated simultaneously, thereby improving the efficiency of battery case coating and improving the efficiency of battery manufacturing.

Additional aspects and advantages of the present application will be set forth in part in the description which follows, and in part will be obvious from the description, or may be learned by practice of the present application.

DESCRIPTION OF DRAWINGS

To describe the technical solutions of the embodiments of the present application more clearly, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
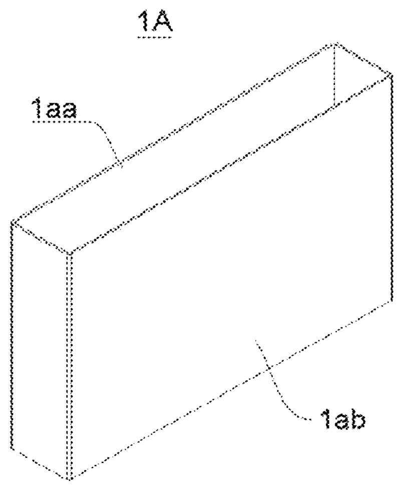
FIG. 1 is a schematic view of a battery case according to some embodiments of the present application.

Reference numerals: 1A—Battery case; 10—Fluidization tank; 11—Air inlet; 12—Partition; 13—Second chamber; 120—Through hole; 20—Clamp; 21—Mounting plate; 22—Clamping portion; 23—Vibrating portion; 30—First heating mechanism; 31—First electromagnetic induction coil; 40—Second heating mechanism; 45—Plasticizing tank; 46—Second electromagnetic induction coil; 50—Robotic arm.

DETAILED DESCRIPTION

The implementations of the present application are to be further described in detail below with reference to the drawings and embodiments. The following detailed description of the examples and the drawings are used to illustrate the principles of the present application by way of example, but should not be used to limit the scope of the present application, that is, the present application is not limited to the described examples.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is simply a description of an association of associated objects, which indicates that there may exist three relationships, for example, A and/or B may mean: the presence of A, the presence of both A and B, and the presence of B. In addition, the character "/" herein generally means that the associated objects before and after it are in an "or" relationship.

In the description of embodiments of the present application, the term "a plurality of" means more than two (including two).

In the description of the embodiments of the present application, the orientation or position relationship indicated by the technical terms "length," "width," "thickness," "inner," "outer," "circumferential", etc. are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

"A plurality of" appearing in the present application means more than two (including two).

In the present application, the battery may include a lithium ion secondary battery, a lithium ion primary battery, a lithium sulfur battery, a sodium/lithium ion battery, a sodium ion battery or a magnesium ion battery and so on, which will not be limited in the embodiments of the present application. The battery may be cylindrical, flat, rectangular, or in other shapes, which is not limited in the embodiments of the present application. Batteries may include cylindrical batteries and prismatic batteries, which are not limited by the present application.

The battery includes a battery case, an end cap, an electrode assembly and an electrolyte. The electrode assembly and the electrolyte are arranged in the battery case, and the end cover covers the opening of the battery case to close the battery case.

The electrode assembly consists of a positive electrode sheet, a negative electrode sheet and a separator. The battery assembly operates mainly relying on movement of metal ions between the positive electrode sheet and the negative electrode sheet.

In order to prevent surface scratches and electric leakage of the battery during subsequent transportation and assembly, the surface of the battery case is generally coated (that is, an insulating film is provided on the surface of the battery). The insulating film can also provide water-proof and dust-proof, thereby better protecting the battery.

In the development of battery technology, it is an urgent technical problem to be solved to improve the production efficiency and quality of batteries. The inventor found that bubbles and wrinkles often exist on the surface of existing battery cases, and the insulating film on the surface of the battery case often peels off, which affects the quality of the battery; meanwhile, the production efficiency of the existing batteries is low. In view of this, the inventor found that the battery case is currently coated by enveloping, that is, the insulating film is enveloped around the surface of the battery case by wrapping with an adhesive. With this manner of coating, not only is the efficiency low, but also air is caused to remain between the insulating film and the battery case to form bubbles, and the insulating film will wrinkle due to low enveloping accuracy and the like. Meanwhile, when the battery is in a high-temperature, high-humidity environment, the adhesive is prone to failure, causing the insulating film to peel off, resulting in low battery quality and low production efficiency.

In view of this, in order to improve the coating quality of the battery case and improve the quality and production efficiency of the battery, the inventor designed a coating device after in-depth research. The coating device includes a fluidization tank, a clamp and a first heating mechanism. The coating device uses a dip coating process to coat the battery case.

The fluidization tank contains dip-coating powder therein. The first heating mechanism is used to heat the battery case. The clamp is used to clamp the battery case and dip the battery case in the dip-coating powder in the fluidization tank. The battery case with the high-temperature surface can melt the dip-coating powder around it, so that the melted dip-coating powder can be adhered and bonded to the surface of the battery case to form an insulating film.

Through the coating device, the dip-coating powder is melted and bonded to the surface of the battery case to form an insulating film, which can overcome the problems of bubbles, wrinkles and easy peel-off of the insulating film on the battery case due to enveloping, improve the coating quality of the battery case, improve the coating efficiency of the battery case (there is no need to provide an adhesive or perform the action of wrapping the insulating film, so the coating efficiency is higher), thereby improving the production efficiency and quality of the battery.

It can be understood that the coating device described in the embodiments of the present application can coat the surface of the battery case or the surface of other workpieces, and for this reason, the embodiments of the present application are not limiting in this respect. In the embodiments of the present application, coating the surface of the battery case is taken as an example for description.

Figure 2:
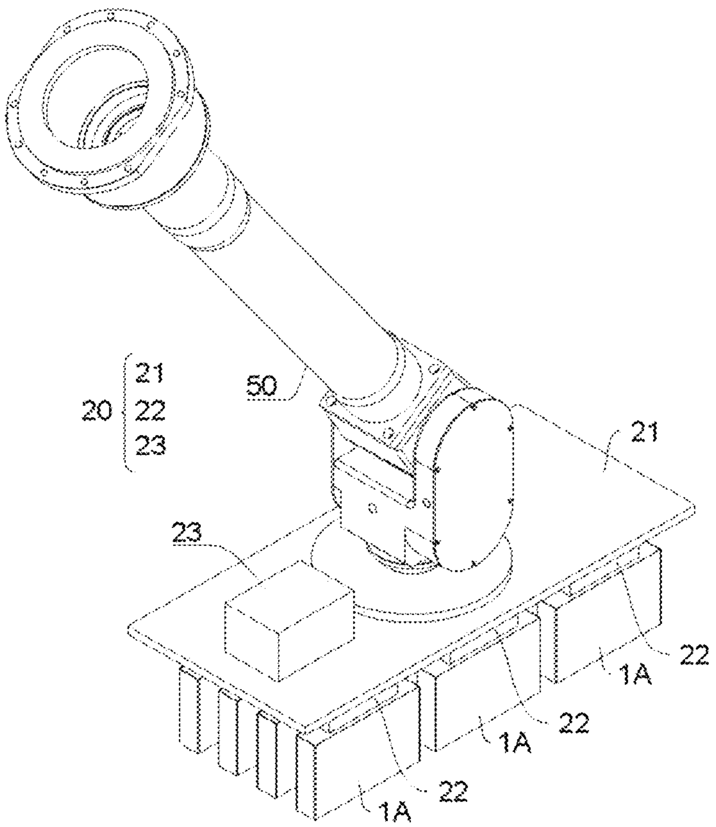
FIG. 2 is a schematic view of a clamp and a battery case according to some embodiments of the present application.
Figure 3:
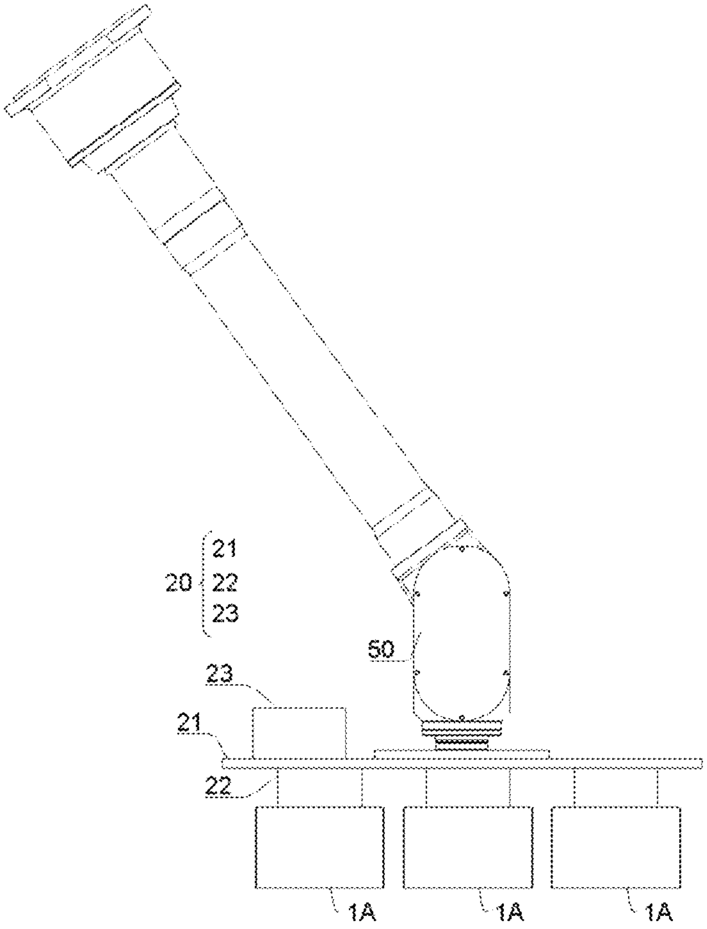
FIG. 3 is a schematic view of a clamp according to some embodiments of the present application.
Figure 4:
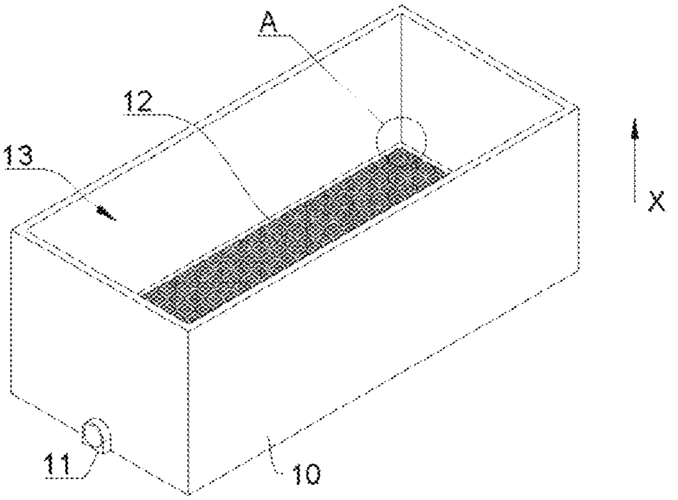
FIG. 4 is a schematic view of a fluidization tank according to some embodiments of the present application.
Figure 5:
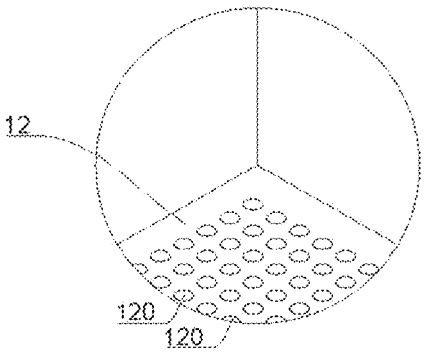
FIG. 5 is an enlarged view of part A in FIG. 4.
Figure 6:
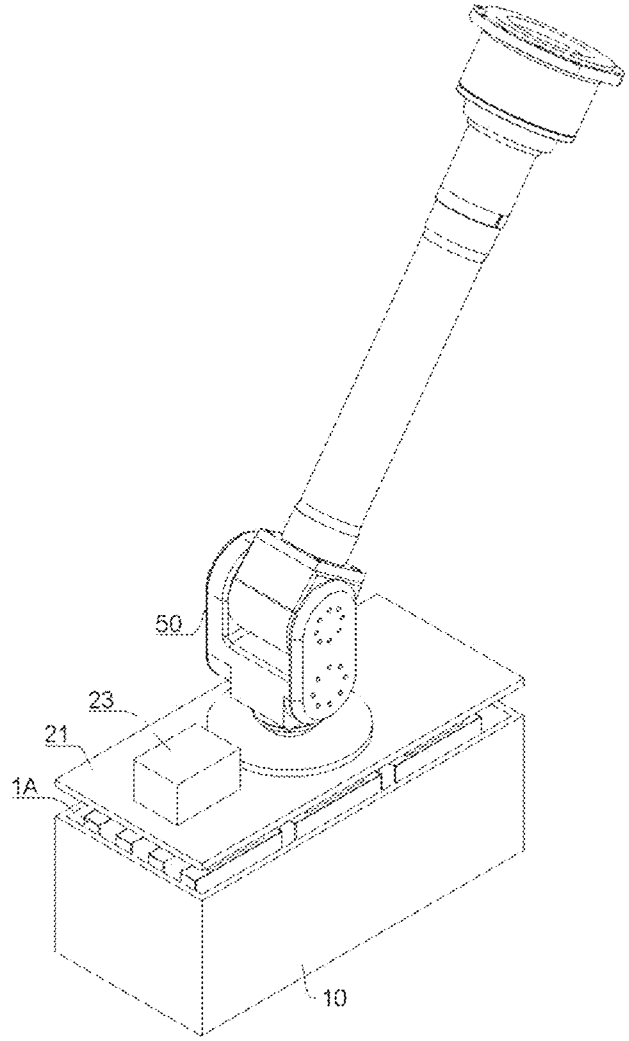
FIG. 6 is a schematic view of a clamp, a fluidization tank and a battery case according to some embodiments of the present application.

According to some embodiments of the present application, referring to FIGS. 1-6, FIG. 1 is a schematic view of a battery case 1A according to some embodiments of the present application, FIG. 2 is a schematic view of a clamp 20 and the battery case 1A according to some embodiments of the present application; FIG. 3 is a schematic view of the clamp 20 according to some embodiments of the present application, FIG. 4 is a schematic view of a fluidization tank 10 according to some embodiments of the present application, FIG. 5 is an enlarged view of part A in FIG. 4, and FIG. 6 is a schematic view of the clamp 20, the fluidization tank 10 and battery case 1A according to some embodiments of the present application.

The coating device includes the fluidization tank 10, the clamp 20 and a first heating mechanism 30 (the first heating mechanism 30 is not shown in FIGS. 1-5). The fluidization tank 10 contains dip-coating powder therein. The clamp 20 is used to clamp the battery case 1A and dip the battery case 1A in the dip-coating powder in the fluidization tank 10. The first heating mechanism 30 is used to heat the battery case 1A so that the dip-coating powder around the battery case 1A is melted and adhered to the surface of the battery case 1A to form an insulating film.

Figure 7:
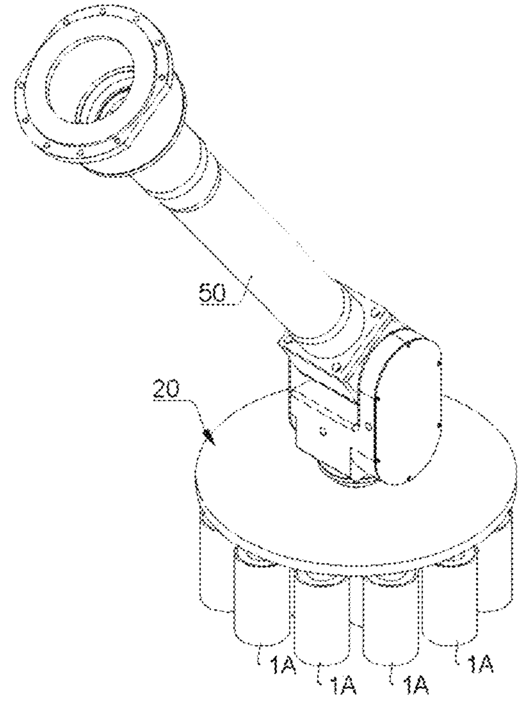
FIG. 7 is a schematic view of a battery case and a clamp according to some other embodiments of the present application.

The coating device can coat the surface of the battery case 1A. The battery case 1A includes but is not limited to a prismatic battery case or a cylindrical battery case. As shown in FIG. 1, the battery case 1A shown in FIG. 1 is a prismatic battery case. As shown in FIG. 7, which is a schematic view of the battery case 1A and the clamp 20 according to some other embodiments of the present application, the battery case 1A shown in FIG. 7 is a cylindrical battery case. The battery case 1A has an opening 1*aa*, a bottom wall and a side wall 1*ab*. The opening 1*aa* and the bottom wall are oppositely arranged along the height direction of the battery case 1A. The side wall 1*ab* surrounds the bottom wall to form a semi-enclosed structure. The surface of the battery case 1A may refer to the outer surface of the bottom wall and the outer surface of the side wall 1*ab*.

The fluidization tank 10 may be a component filled with dip-coating powder. The fluidization tank 10 has a chamber inside, and the fluidization tank 10 has an opening in communication with the chamber. The dip-coating powder can be loaded into the chamber of the fluidization tank 10 through this opening.

The dip-coating powder may be a thermoplastic powder that is resistant to high temperatures and has flame retardant properties. In some embodiments, the melting point of the dip-coating powder is ≥100° C., the burning point is ≥300° C., and the diameter of the dip-coating powder is ≤100 um. The smaller the diameter of the dip-coating powder, the better the uniformity of its adhesion to the surface of the battery case 1A after being melted by heat. In some embodiments, the dip-coating powder may be a high-temperature resistant polyethylene thermoplastic powder.

The first heating mechanism 30 is a component capable of heating the battery case 1A. By heating the battery case 1A, the surface of the battery case 1A is enabled to have a high temperature.

The clamp 20 may be a component capable of clamping the battery case 1A. In some embodiments, the clamp 20 cooperates with a robotic arm 50 to perform the following actions: clamping the battery case 1A, and dipping the battery case 1A in the dip-coating powder through the opening of the fluidization tank 10. In some other embodiments, the clamp 20 can perform the following actions: clamping the battery case 1A, moving the battery case 1A to the first heating mechanism 30 to be heated, and then moving the battery case 1A to the fluidization tank 10 and dipping it in the dip-coating powder.

The expression “so that the dip-coating powder around the battery case 1A is melted and adhered to the surface of the battery case 1A to form an insulating film” means that the high temperature on the surface of the battery case 1A will cause the dip-coating powder located around the surface of the battery case 1A to be melted, and the melted dip-coating powder will be adsorbed (bonded) to the surface of the battery case 1A to form an insulating film with insulating properties. The insulating film can provide water-proof, dust-proof, scratch-proof and electric-leakage-proof, thereby effectively protecting the battery.

In the above solution, the coating device can be used to coat the battery case 1A through the dip coating process (the dip coating process refers to the process where heating the battery case 1A so that the high temperature on the surface of the battery case 1A can melt the dip-coating powder and cause it to be adhered to the surface of the battery case 1A to form a uniform insulating film). Because the insulating film formed by the dip coating process has good uniformity, does not generate bubbles, and has strong adhesion, the quality problems of bubbles, wrinkles and peel-off of the insulating film caused by enveloping (where the insulating film is enveloped on the surface of the battery case 1A through an adhesive) can be solved, and the coating efficiency of the battery case 1A can be improved (it is not necessary to provide an adhesive or perform the action of wrapping the insulating film, so the coating efficiency is higher), so that the battery case 1A has higher quality and production efficiency, which in turn makes battery quality and production efficiency higher.

According to some embodiments of the present application, referring to FIG. 5, the clamp 20 includes a mounting plate 21 and a clamping portion 22. The clamping portion 22 is connected to the mounting plate 21 and is used to clamp the battery case 1A. The mounting plate 21 is configured to cover the opening of the fluidization tank 10.

The clamping portion 22 is a component for clamping the battery case 1A. In some embodiments, the clamping portion 22 may be of a negative pressure adsorption type, and can firmly adsorb the battery case 1A through the principle of negative pressure; in some other embodiments, the clamping portion 22 may be of an internal support type, and goes deep into the interior of the battery case 1A via the opening of the battery case 1A to tighten the inner wall of the battery case 1A, and clamp the battery case 1A firmly through the effect of friction. It should be noted that the negative pressure adsorption type and the internal support type are common solutions for clamping the battery case in the art. Those skilled in the art clearly know their technical principles, so detailed description thereof will not be made again with respect to the embodiments of the present application.

The mounting plate 21 may be a component connected to the clamping portion 22. Refer to FIGS. 2 and 3. The clamping portion 22 is provided on the bottom surface of the mounting plate 21. The top surface of the mounting plate 21 may be connected to the robotic arm 50. The operation of the robotic arm 50 enables movement of the battery case 1A. Referring to FIG. 6, when the clamp 20 dips the battery case 1A in the dip-coating powder in the fluidization tank 10, the mounting plate 21 can cover the opening of the fluidization tank 10, so that the dip-coating powder and the battery case 1A are in a closed environment.

In the above solution, the clamp 20 has a simple structure and is easy to manufacture. The clamping portion is 22 used to clamp the battery case 1A to fix the battery case 1A, and then enable movement of the battery case 1A. The mounting plate 21 is connected to the clamping portion 22. When the battery case 1A enters the fluidization tank 10, the mounting plate 21 can cover the opening of the fluidization tank 10 to avoid leakage of the dip-coating powder in the fluidization tank 10 and ensure safety of the operating environment.

According to some embodiments of the present application, the clamping portion 22 has a sealing member (not shown) for sealing the opening of battery case 1A.

The sealing member is a component that can seal the opening of the battery case 1A. For example, the sealing member may be a sealing ring, a sealing cap or a sealing cover that matches the opening of the battery case 1A. When the clamping portion 22 clamps the battery case 1A, the sealing member can seal the opening of the battery case (the sealing process may include but is not limited to closing the opening of the battery case with the sealing member, or mating the sealing member with the bottom surface of the mounting plate 21 to close the opening of the battery case) to isolate the interior of the battery case 1A from the exterior, prevent the dip-coating powder from entering the interior of the battery case 1A, and prevent the dip-coating powder from being melted and adhered to the inner wall of the battery case 1A.

In the above solution, the sealing member is provided so that the opening of the battery case 1A can be sealed while the clamping portion 22 is clamping the battery case 1A, thereby preventing the dip-coating powder from entering the interior of the battery case 1A through the opening of the battery case 1A, ensuring the quality of the coating on the surface of the battery case 1A.

According to some embodiments of the present application, referring to FIGS. 2 and 3, the clamp 20 includes a plurality of clamping portions 22 for clamping a plurality of battery cases 1A, and the plurality of clamping portions 22 are all connected to the mounting plate 21.

In some embodiments, a plurality of clamping portions 22 are connected to the bottom surface of the mounting plate 21, and the individual clamping portions 22 are spaced apart to clamp the battery cases respectively. Since the clamp 20 has a plurality of clamping portions 22, the clamp 20 can clamp a plurality of battery cases 1A simultaneously to coat the plurality of battery cases 1A simultaneously.

As shown in FIG. 2, the plurality of clamping portions 22 are distributed in a rectangular array, so as to clamp the plurality of battery cases 1A distributed in a rectangular array simultaneously. As shown in FIG. 7, the plurality of clamping portions 22 are distributed in a circular array, so as to clamp the plurality of battery cases 1A distributed in a circular array simultaneously.

Among the above solutions, in contrast to the solutions of enveloping or spraying (using the electrostatic powder spraying method to coat the battery case 1A), if the dip coating process is used to coat the battery case, the battery case 1A can be coated in batches. Therefore, a plurality of clamping portions 22 are provided to clamp a plurality of battery cases 1A simultaneously, and consequently the plurality of battery cases 1A can be dipped and coated simultaneously, thereby improving the efficiency of coating of the battery case 1A and improving the efficiency of battery manufacturing.

According to some embodiments of the present application, as shown in FIGS. 2 and 6, the clamp 20 further includes a vibrating portion 23 provided on the mounting plate 21 for vibrating the clamping portion 22.

The vibrating portion 23 is a component that can generate vibration. In some embodiments, the vibrating portion 23 may be a small high-frequency vibrator with a vibration frequency ≥2000 Hz and a vibration force ≥10 kg, such as the ZHEKE brand ZK-0.10S small vibration motor.

The vibration generated by the vibrating portion 23 can be transmitted through the mounting plate 21 and the clamping portion 22 and act on the battery case 1A, causing the surface of the battery case 1A to vibrate.

In the above solution, by providing the vibrating portion 23, the battery case 1A clamped by the clamping portion 22 can be vibrated, thereby making the dip-coating powder adhered to the surface of the battery case 1A more uniform, so that the battery case 1A has good coating quality, leading to higher quality of the battery.

According to some embodiments of the present application, referring to FIG. 4, the fluidization tank 10 has an air inlet 11 for introducing gas into the interior of the fluidization tank 10, so that the dip-coating powder is in a fluidized state.

The air inlet 11 can be provided on the side wall or the bottom wall of the fluidization tank 10. As shown in FIG. 4, the air inlet 11 is provided on the side wall of the fluidization tank 10 to supply gas to the interior of the fluidization tank 10 from the lateral side of the fluidization tank 10.

In some embodiments, a gas supply device (such as a gas tank or a blower, etc.) is connected to the air inlet 11 through a gas pipe to supply gas to the interior of the fluidization tank 10 to enable the gas to act on the dip-coating powder so that the dip-coating powder is in a fluidized state. The fluidized state can refer to the state in which the dip-coating powder is tumbling and flowing in the fluidized tank under the action of gas.

In the above solution, gas is introduced into the interior of the fluidization tank 10 by providing the air inlet 11, so that the dip-coating powder is in a fluidized state in the fluidization tank 10, thereby improving the uniformity of the dip-coating powder adhered to the surface of the battery case 1A.

According to some embodiments of the present application, referring to both FIG. 4 and FIG. 5, a partition 12 is provided inside the fluidization tank 10. The partition 12 divides the interior of the fluidization tank 10 into a first chamber (not shown in the figures) and a second chamber 13 along the height direction X of the fluidization tank 10. The partition 12 has a plurality of through holes 120 to communicate the first chamber with the second chamber 13. The diameter of the through holes 120 is less than or equal to the diameter of the dip-coating powder. The air inlet 11 is in communication with the first chamber, and the second chamber 13 is filled with dip-coating powder.

The partition 12 is plate-shaped and divides the interior of the fluidization tank 10 into a first chamber and a second chamber 13 along the height direction X of the fluidization tank 10, that is, the direction from the bottom wall of the fluidization tank 10 to the opening of the fluidization tank 10. The first chamber is located below the second chamber 13, and the opening of the fluidization tank 10 is in communication with the second chamber 13. The partition 12 has a plurality of through holes 120 in the shape of micropores, and the diameter of each through hole 120 is less than or equal to the diameter of the dip-coating powder. For example, when the diameter of the dip-coating powder is 100 um, the diameter of each through hole 120 is less than or equal to 100 um.

The dip-coating powder is loaded in the second chamber 13. The air inlet 11 is provided on the side wall of the fluidization tank 10 and is in communication with the first chamber. The gas enters the second chamber 13 through the first chamber via the through holes 120 to act on the dip-coating powder in the second chamber 13, causing it to tumble and flow to a fluidized state. In some embodiments, the plurality of through holes 120 on the partition 12 can be arranged at even intervals, so that the gas acting on the dip-coating powder from the first chamber through the through holes 120 has better uniformity, so that the dip-coating powder is subjected to uniform force.

In the above solution, by providing the partition 12, on the one hand, the uniformity of the gas flowing into the second chamber 13 can be improved, the fluidity of the dip-coating powder can be improved, and the uniformity of adhesion to the surface of the battery case 1A can be improved; on the other hand, as the diameter of the through holes 120 is less than or equal to the diameter of the dip-coating powder, the dip-coating powder can be prevented from pouring back and blocking the air inlet 11.

According to some embodiments of the present application, the first heating mechanism 30 is located outside the fluidization tank 10 for preheating the battery case 1A before it is dipped in the dip-coating powder.

The expression "the first heating mechanism 30 is located outside the fluidization tank 10" may mean that the first heating mechanism 30 heats the battery case 1A before it is dipped in the dip-coating powder, i.e., preheats the battery case 1A, so that the surface of the battery case 1A is in a high-temperature state. Then, the battery case 1A, which has been preheated and has a high surface temperature, is dipped in the dip-coating powder. The residual heat on the surface of the battery case 1A is used to melt the dip-coating powder around it, so that the dip-coating powder is melted and adhered to the surface of the battery case 1A to form an insulating film.

In some embodiments, the first heating mechanism 30 may be a device capable of heating the battery case 1A, such as a heating furnace, an oven, or the like.

In some embodiments, the preheating temperature at which the battery case 1A is preheated by the first heating mechanism 30 is higher than the melting point of the dip-coating powder, and the difference between the two may be 20° C.-50° C.

In the above solution, the first heating mechanism 30 is used to preheat the battery case 1A, that is, to heat the battery case 1A before it is dipped in the dip-coating powder.

Figure 8:
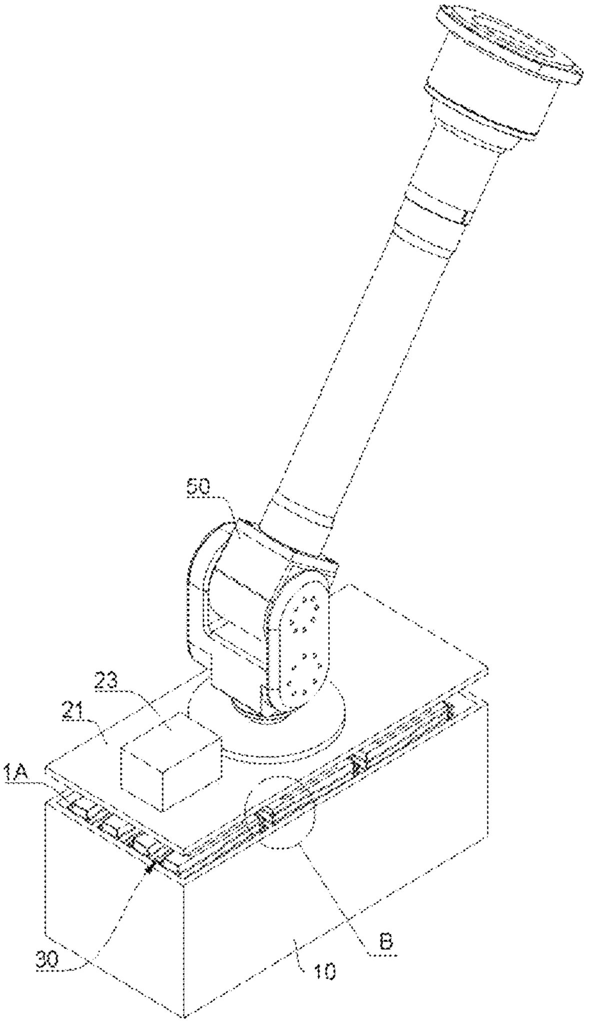
FIG. 8 is a schematic view of a fluidization tank, a first heating mechanism, a clamp and a battery case according to some embodiments of the present application.
Figure 9:
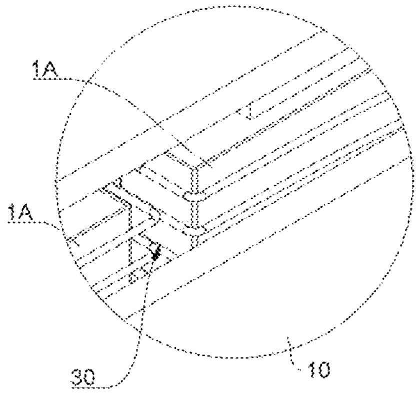
FIG. 9 is a enlarged view of part B in FIG. 8.

According to some embodiments of the present application, referring to FIG. 8, FIG. 8 is a schematic view of the fluidization tank 10, the first heating mechanism 30, the clamp 20 and the battery case 1A according to some embodiments of the present application, and FIG. 9 is an enlarged view of part B in FIG. 8. The first heating mechanism 30 is located inside the fluidization tank 10 and is used to heat the battery case 1A after it is dipped in the dip-coating powder.

The expression "the first heating mechanism 30 is located inside the fluidizing tank 10" may mean that the battery case 1A is heated by the first heating mechanism 30 only after it is dipped in the dip-coating powder. That is, when the battery case 1A is in the state of being dipped in the dip-coating powder, the first heating mechanism 30 heats the surface of the battery case 1A. The battery case 1A in a high-temperature state will melt the dip-coating powder around it, so that the dip-coating powder is melted and adhered to the surface of the battery case 1A to form an insulating film.

In some embodiments, the preheating temperature at which the battery case 1A is preheated by the first heating mechanism 30 is higher than the melting point of the dip-coating powder, and the difference between the two may be 5° C.-250° C.

In the above solution, the first heating mechanism 30 is arranged in the fluidization tank 10, so that it can heat the battery case after the battery case is dipped in the dip-coating powder. Therefore, compared with the solution of preheating the battery case, heat loss of the battery case during its movement from the first heating mechanism 30 (e.g., a device capable of heating the battery case 1A, such as a heating furnace, an oven, or the like) to the fluidization tank 10 can be avoided, so that the battery case can be heated with less energy, thereby saving energy.

Figure 10:
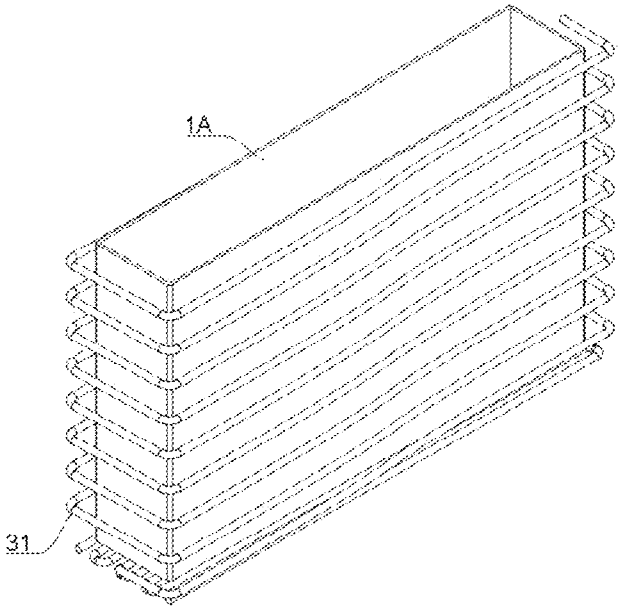
FIG. 10 is a schematic view of a first electromagnetic induction coil and a battery case according to some embodiments of the present application.

According to some embodiments of the present application, refer to FIG. 10, which is a schematic view of the first electromagnetic induction coil 31 and the battery case 1A according to some embodiments of the present application.

The first heating mechanism 30 is a first electromagnetic induction coil 31.

The first electromagnetic induction coil 31 adopts the principle of induction heating and can heat the battery case 1A dipped in the dip-coating powder without affecting the dip-coating powder. Induction heating uses the electromagnetic induction method to generate electric current inside the material to be heated (the battery case 1A), and relies on the energy of these eddy currents for heating purposes.

In some embodiments, the first electromagnetic induction coil 31 can be connected to an external power supply through a wire passing through the wall of the fluidization tank 10 to realize heating of the battery case 1A by the first electromagnetic induction coil 31.

In the above solution, the battery case 1A is heated by the first electromagnetic induction coil 31, which can heat the battery case 1A effectively and accurately, so that the surface of the battery case 1A is at a suitable temperature, and the dip-coating powder around the battery case 1A can be effectively melted, and consequently the thickness of the insulating film on the surface of the battery case can be accurately controlled, so that the battery has higher quality.

According to some embodiments of the present application, the first electromagnetic induction coil 31 encloses a first cavity for accommodating the battery case 1A.

As shown in FIG. 10, in some embodiments, the side periphery of the first electromagnetic induction coil 31 adopts an S-shaped spiral winding layout and the bottom of the first electromagnetic induction coil 31 adopts an S-shaped planar layout to enclose a first cavity corresponding to the outer contour of the battery case 1A. The first electromagnetic induction coil 31 has a part corresponding to the side wall of the battery case 1A, and also has a part corresponding to the bottom wall of the battery case 1A, so as to heat the surface of the battery case 1A effectively and uniformly. In some other embodiments, the layout of the first electromagnetic induction coil 31 is not limited, as long as it can heat the battery case 1A.

In some embodiments, when a plurality of battery cases 1A are heated simultaneously, a plurality of first electromagnetic induction coils 31 are provided in the fluidization tank 10, and the first electromagnetic induction coils 31 are in one-to-one correspondence with the battery cases 1A. The plurality of first electromagnetic induction coils 31 are connected in series with each other. In some embodiments, the plurality of first electromagnetic induction coils 31 can be connected into one body through a coil bracket and installed in the fluidization tank 10 through the coil bracket; meanwhile, in order to improve the convenience of installation and maintenance, the coil bracket may be connected with the fluidization tank 10 through a quick-release screw.

In the above solution, the first electromagnetic induction coil 31 encloses a first cavity for accommodating the battery case 1A to heat any position on the surface of the battery case 1A effectively and accurately, so that the surface of the battery case 1A is at a suitable temperature, and the dip-coating powder around the battery case 1A can be effectively melted, and consequently the thickness of the insulating film on the surface of the battery case can be accurately controlled, so that the battery has higher quality.

In other embodiments, the first electromagnetic induction coil 31 may also be arranged around the outer periphery of the fluidization tank 10 and can heat the battery case 1A in the fluidization tank 10 as well.

Figure 11:
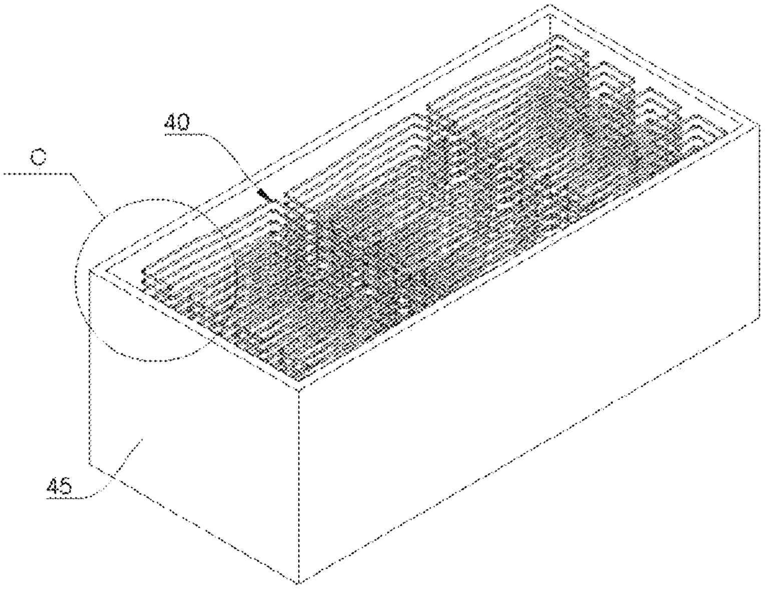
FIG. 11 is a schematic view of a plasticizing tank according to some embodiments of the present application.

According to some embodiments of the present application, the coating device further includes a second heating mechanism 40 (shown in FIG. 11). The second heating mechanism 40 is used to heat the battery case 1A having its surface covered with an insulating film to melt the insulating film to make the surface of the insulating film uniform.

The second heating mechanism 40 may be a component that heats the battery case 1A after it is removed from the fluidization tank 10, and may function to melt the insulating film adhered to the surface of the battery case 1A to melt and plasticize it (plasticizing means heating and melting the dip-coating powder adhered to the surface of the battery case 1A that has not been melted or has not been completely melted to make the insulating film on the surface of the battery case 1A uniform) to achieve good uniformity.

In the above solution, the battery case 1A with the adhered insulating film is removed from the fluidization tank 10, and through heating by the second heating mechanism 40, the dip-coating powder adhered to the surface of the battery case 1A can be melted, making the insulating film on the surface of the battery case 1A more uniform.

According to some embodiments of the present application, refer to FIG. 11, which is a schematic structural view of a plasticizing tank 45 according to some embodiments of the present application. The coating device also includes a plasticizing tank 45. The second heating mechanism 40 is provided in the plasticizing tank 45. The clamp 20 is also used to place the battery case 1A in the plasticizing tank 45.

The interior of the plasticizing tank 45 is used for placing the battery case 1A. The second heating mechanism 40 is provided in the plasticizing tank 45 and used to heat the battery case 1A. The internal volume of the plasticizing tank 45 may correspond to the battery case 1A clamped by the clamp 20 to ensure that the plasticizing tank 45 has a suitable internal volume so that the heat generated by the second heating mechanism 40 can be effectively utilized in order to ensure effective plasticizing.

In some other embodiments, the coating device may not be provided with the plasticizing tank 45, and the second heating mechanism 40 may be a device capable of heating the battery case 1A, such as a heating furnace, an oven or the like. In some other embodiments, the second heating mechanism 40 and the first heating mechanism 30 may be the same heating setting, and this heating setting can provide different heating temperatures to the battery case 1A. For example, the second heating mechanism 40 and the first heating mechanism 30 may be an oven or a heating furnace with adjustable heating power.

In some embodiments, the clamp 20 can remove the battery case 1A from the fluidization tank 10 and then put it in the plasticizing tank 45. The second heating mechanism 40 operates to heat the surface of the battery case 1A to melt the insulating film on the surface so as to make it more uniform.

In the above solution, the second heating mechanism 40 is provided in the plasticizing tank 45, and can effectively heat the surface of the battery case 1A, thereby making the insulating film on the surface of the battery case 1A more uniform.

According to some embodiments of the present application, the second heating mechanism 40 is a second electromagnetic induction coil 46.

The second electromagnetic induction coil 46 uses the principle of induction heating to heat the battery case 1A.

In some embodiments, the second electromagnetic induction coil 46 can be connected to an external power supply through a wire passing through the wall of the fluidization tank 45 to realize heating of the battery case 1A by the second electromagnetic induction coil 46.

In the above solution, the battery case 1A is heated by the second electromagnetic induction coil 46, which can heat the battery case 1A effectively and accurately, so that the surface of the battery case 1A is at a suitable plasticizing temperature to melt the dip-coating powder on the surface of the battery case 1A effectively, and consequently the thickness of the insulating film on the surface of the battery case can be accurately controlled, so that the battery has higher quality.

According to some embodiments of the present application, the second electromagnetic induction coil 46 encloses a second cavity for accommodating the battery case 1A.

Figure 12:
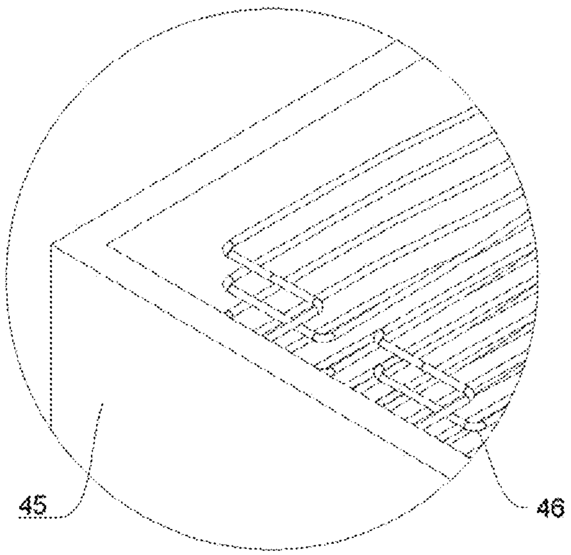
FIG. 12 is an enlarged view of part C in FIG. 11.

Referring to FIG. 10 and FIG. 12 respectively, FIG. 12 is an enlarged view of part C in FIG. 11. In some embodiments, the side periphery of the second electromagnetic induction coil 46 adopts an S-shaped spiral winding layout and the bottom of the second electromagnetic induction coil 46 adopts an S-shaped planar layout to enclose a second cavity corresponding to the outer contour of the battery case 1A. The second electromagnetic induction coil 46 has a part corresponding to the side wall of the battery case 1A, and also has a part corresponding to the bottom wall of the battery case 1A, so as to heat the surface of the battery case 1A effectively and uniformly. In some other embodiments, the layout of the second electromagnetic induction coil 46 is not limited, as long as it can heat the battery case 1A.

In some embodiments, when a plurality of battery cases 1A are heated simultaneously, a plurality of second electromagnetic induction coils 46 are provided in the plasticizing tank 45, and the second electromagnetic induction coils 46 are in one-to-one correspondence with the battery cases 1A. The plurality of second electromagnetic induction coils 46 are connected in series with each other. In some embodiments, the plurality of second electromagnetic induction coils 46 can be connected into one body through a coil bracket and installed in the plasticizing tank 45 through the coil bracket; meanwhile, in order to improve the convenience of installation and maintenance, the coil bracket can be connected with the plasticizing tank 45 through a quick-release screw.

In the above solution, the second electromagnetic induction coil 46 encloses a second cavity for accommodating the battery case 1A to heat the surface of the battery case 1A effectively and accurately, so that the surface of the battery case 1A is at a suitable plasticizing temperature to melt the dip-coating powder on the surface of the battery case 1A effectively, and consequently the thickness of the insulating film on the surface of the battery case can be accurately controlled, so that the battery has higher quality.

In other embodiments, the second electromagnetic induction coil 46 may also be arranged around the outer periphery of plasticizing tank 45 and can also heat the battery case 1A in the plasticizing tank 45.

Figure 13:
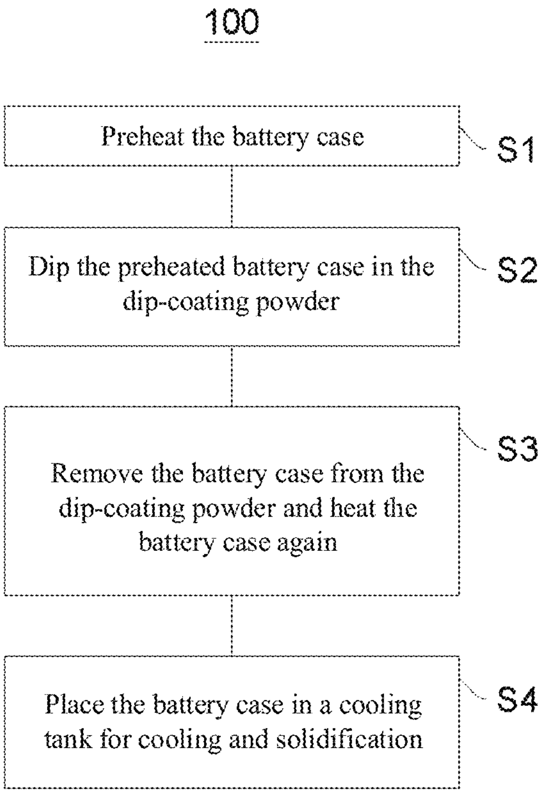
FIG. 13 is a schematic flowchart of a coating method according to some embodiments of the present application.

According to some embodiments of the present application, a coating method is further provided. Refer to FIG. 13, which is a schematic flow chart of the coating method 100 according to some embodiments of the present application. The coating method 100 comprises the following steps:

S1: preheating a battery case 1A; and

S2: dipping the preheated battery case 1A in the dip-coating powder, melting the dip-coating powder around the battery case 1A by residual heat of the battery case 1A and adhering it to the surface of the battery case 1A to form an insulating film.

In some embodiments, in the step S1, a device capable of heating the battery case 1A, such as a heating furnace, an oven or the like, may be used to preheat the battery case 1A.

In some embodiments, in the step S2, the battery case 1A can be dipped in the dip-coating powder through a device capable of clamping the battery case 1A, such as a robotic arm or a clamp 20. In some embodiments, the dip-coating powder may be contained within the fluidization tank 10.

In the above solution, the surface of the battery case is coated by dip coating. Compared with the solution of coating the surface of the battery case by enveloping, it has the advantages of strong adhesion and absence of bubbles and wrinkles of the insulating film, and can effectively improve the battery quality and production efficiency.

According to some embodiments of the present application, in the step S1 of preheating the battery case 1A:

the preheating temperature for the battery case 1A is M1, and the melting point of the dip-coating powder is M2, where 20° C.≤M1−M2≤50° C.

In the step S1, the preheating temperature M1 for the battery case 1A is higher than the melting point M2 of the dip-coating powder, satisfying the condition 20° C.≤M1−

M2≤50° C. For example, when the melting point M2 of the dip-coating powder is 100° C., the value range of M1 is 120° C.≤M1≤150° C., that is, the preheating temperature for the surface of the battery case 1A may be 120° C., 121° C., 122° C., 123° C. . . . 149° C. or 150° C.

In the above solution, since the battery case 1A is heated by means of preheating, the heat loss during movement from the preheating position to the dip-coating powder position (e.g., during movement of the battery case 1A from the heating furnace to the fluidization tank 10) needs to be considered. If the difference between the preheating temperature and the melting point temperature M2 of the dip-coating powder is less than 20° C., it will cause the problem of incapability of melting the dip-coating powder. If the difference between the preheating temperature and the melting point temperature M2 of the dip-coating powder is greater than 50° C., however, it will cause the problem of excessively thick insulating film on the surface of the battery case 1A, causing poor quality of the coating. Therefore, in this solution, the preheating temperature M1 is limited so that the preheating temperature M1 satisfies the condition 20° C.≤M1−M2≤50° C., so that the insulating film can be adhered to the surface of the battery case and the insulating film has a suitable thickness.

According to some embodiments of the present application, the step S2 of dipping the preheated battery case 1A in the dip-coating powder includes: dipping the preheated battery case 1A in the dip-coating powder, and vibrating the battery case 1A.

In the step S2, while the battery case 1A is dipped in the dip-coating powder, the battery case 1A is also vibrated.

In some embodiments, when the clamp 20 is used to clamp the battery case 1A, a vibrating portion 23 (the vibrating portion 23 may be a small high-frequency vibrator) can be provided on the clamp 20 to vibrate the battery case 1A, so that the melted dip-coating powder adheres uniformly to the surface of the battery case 1A.

In the above solution, while the preheated battery case 1A is dipped in the dip-coating powder, the battery case 1A is vibrated so that the dip-coating powder that is melted and adhered to the surface of the battery case is uniformly distributed, thereby improving the uniformity of the insulating film.

According to some embodiments of the present application, referring to FIG. 13, after the step S2 of dipping the preheated battery case 1A in the dip-coating powder, the method further includes:

S3: removing the battery case 1A from the dip-coating powder, and heating the battery case 1A again to melt the insulating film adhered to the surface of the battery case 1A to make the surface of the insulating film uniform.

In the step S3, the battery case 1A is first removed from the dip-coating powder, and then the surface of the battery case 1A is heated to melt the insulating film on the surface of the battery case 1A to achieve plasticizing, so that the surface of the battery case 1A has an insulating film with high uniformity.

In the step S3, a device capable of heating the battery case 1A, such as a heating furnace, an oven or the like, may be used to heat battery case 1A.

In the above solution, by removing the battery case 1A from the dip-coating powder and heating the battery case 1A again to achieve heating and plasticizing, the insulating film on the surface of the battery case 1A can be made more uniform, and the coating quality of the battery case 1A can be better, so that the battery has higher quality.

According to some embodiments of the present application, the step S3 of removing the battery case 1A from the dip-coating powder and heating the battery case 1A again includes: removing the battery case 1A from the dip-coating powder, and heating the battery case 1A again while vibrating the battery case 1A.

In some embodiments, in the step S3, while heating the surface of the battery case 1A, the battery case 1A can be vibrated through the vibrating portion 23.

In the above solution, during heating and plasticizing, vibrating the battery case 1A can make the insulating film more uniform, thereby effectively improving the quality of the battery.

According to some embodiments of the present application, the step S1 of preheating the battery case 1A includes: preheating a plurality of battery cases 1A simultaneously.

The step S2 of dipping the preheated battery case 1A in the dip-coating powder includes dipping a plurality of battery cases 1A in the dip-coating powder simultaneously.

The step S3 of removing the battery case 1A from the dip-coating powder and heating the battery case 1A again includes: removing a plurality of battery cases 1A from the dip-coating powder simultaneously and heating the plurality of battery cases 1A simultaneously again.

In some embodiments, the clamp 20 can clamp a plurality of battery cases 1A simultaneously, so that the step S1, step S2 and step S3 can be performed simultaneously.

In the above solution, since the coating of the surface of the battery case 1A is achieved by using the dip coating process, a plurality of battery cases 1A can be coated simultaneously, thereby improving the efficiency of coating of the battery cases 1A and improving the efficiency of manufacturing of the battery.

In some embodiments, after performing the step S3, the method may further include the following step:

S4. placing the battery case 1A in a cooling tank for cooling and solidification.

The cooling tank refers to a component that can cool the surface of the battery case 1A so that the insulating film is cooled and solidified.

In some implementations, before performing the step S1, the method may further include the step of pretreating the surface of the battery case 1A to remove oil stains and other contaminants on the battery case 1A while increasing adhesion of the dip-coating powder. Pretreatment processes that can be used include ultrasonic surface degreasing, degreasing agent wiping, etc.

Figure 14:
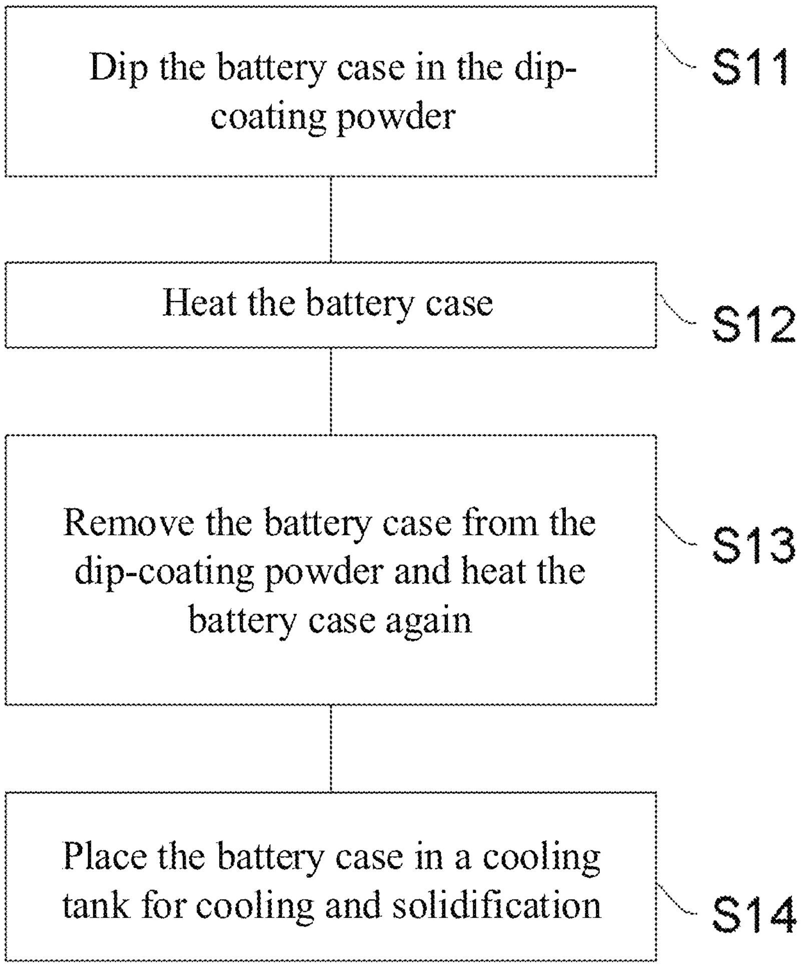
FIG. 14 is a schematic flowchart of a coating method according to some other embodiments of the present application.

According to some embodiments of the present application, a coating method 200 is further provided. Refer to FIG. 14, which is a schematic flow chart of the coating method 200 according to some embodiments of the present application.

The coating method 200 comprises the following steps:

S11: dipping a battery case 1A in dip-coating powder; and

S12: heating the battery case 1A so that the dip-coating powder around the battery case 1A is melted and adhered to the surface of the battery case 1A to form an insulating film.

In the step S12, the battery case 1A is heated after the battery case 1A has been dipped in the dip-coating powder.

In some embodiments, in the step S11, the battery case 1A can be dipped in the dip-coating powder through a device capable of clamping the battery case 1A, such as a robotic arm, a clamp 20 or the like. In some embodiments, the dip-coating powder may be contained within the fluidization tank 10.

In the above solution, in contrast to preheating the battery case 1A, in this solution, the battery case 1A is heated after being dipped in the dip-coating powder, which can effectively avoid heat loss during movement of the battery case 1A and increase energy utilization, and the battery case 1A is enabled to effectively melt the dip-coating powder around it, ensuring the effective formation of the insulating film.

According to some embodiments of the present application, the step S12 of heating the battery case 1A includes heating the battery case 1A while vibrating the battery case 1A.

In some embodiments, when the clamp 20 is used to clamp the battery case 1A, a vibrating portion 23 (the vibrating portion 23 may be a small high-frequency vibrator) can be provided on the clamp 20 to vibrate the battery case 1A, so that the melted dip-coating powder adheres uniformly to the surface of the battery case 1A.

In the above solution, while the dip-coating powder is melted and adhered to the surface of the battery case 1A, the battery case is vibrated so that the dip-coating powder adhered to the surface of the battery case is uniformly distributed, thereby improving the uniformity of the insulating film.

According to some embodiments of the present application, in the step S12 of heating the battery case 1A, the heating temperature for the battery case 1A is M3, and the melting point of the dip-coating powder is M2, where 5° C.≤M3−M2≤50° C., the heating temperature for the battery case 1A is M3, and the melting point of the dip-coating powder is M2, where 25° C.≤M3−M2≤50° C.

In the step S12, the heating temperature M3 for the battery case 1A is higher than the melting point M2 of the dip-coating powder, satisfying the condition 5° C.≤M3−M2≤50° C. For example, when the melting point M2 of the dip-coating powder is 100° C., and the value range of M3 is 105° C.≤M3≤150° C., that is, the heating temperature for the surface of the battery case 1A may be 105° C., 106° C., 107° C., 108° C. . . . 149° C. or 150° C.

In the above solution, since the battery case 1A is heated in the dip-coating powder, substantial heat loss can be avoided. Compared with the preheating solution, the heating temperature for the battery case 1A can be lowered. If the difference between the heating temperature and the melting point temperature M2 of the dip-coating powder is less than 5° C., it will cause the problem of incapability of melting the dip-coating powder. If the difference between the heating temperature and the melting point temperature M2 of the dip-coating powder is greater than 50° C., however, it will cause the problem of excessively thick insulating film on the surface of the battery case 1A, causing poor quality of the coating. Therefore, in this solution, the heating temperature M3 is limited so that the heating temperature M3 satisfies the condition 5° C.≤M3−M2≤50° C., so that the insulating film can be adhered to the surface of the battery case and the insulating film has a suitable thickness.

According to some embodiments of the present application, the step S12 of heating the battery case 1A includes heating the battery case 1A through the first electromagnetic induction coil 31.

The first electromagnetic induction coil 31 may be provided in the fluidization tank 10. The first electromagnetic induction coil 31 adopts the principle of induction heating and can heat the battery case 1A dipped in the dip-coating powder without affecting the dip-coating powder. Induction heating uses the electromagnetic induction method to generate electric current inside the material to be heated (the battery case 1A), and relies on the energy of these eddy currents for heating purposes.

In the above solution, the first electromagnetic induction coil 31 is used to heat the battery case 1A. On the one hand, the dip-coating powder will not be heated, ensuring that the battery case 1A can be coated smoothly and effectively. On the other hand, the charge passing through the first electromagnetic induction coil 31 can be controlled to control its heating power, and consequently accurately control the temperature of the surface of the battery case 1A, so that the insulating film on the battery surface has better quality, and consequently the battery has higher quality.

According to some embodiments of the present application, after the step S12 of heating the battery case 1A, the method further includes:

S13: removing the battery case 1A from the dip-coating powder, and heating the battery case 1A again to melt the insulating film adhered to the surface of the battery case 1A to make the surface of the insulating film uniform.

In the step S13, the battery case 1A is first removed from the dip-coating powder, and then the surface of the battery case 1A is heated to melt the insulating film on the surface of the battery case 1A to achieve plasticization, so that the surface of the battery case 1A has an insulating film with high uniformity.

In some embodiments, in the step S13, a device capable of heating the battery case 1A, such as a heating furnace, oven or the like, may be used to heat the battery case 1A.

In some embodiments, in the step S13, the battery case 1A can be heated by the second electromagnetic induction coil 46. When the second electromagnetic induction coil 46 is used to heat the battery case 1A, the second electromagnetic induction coil 46 can be provided in the plasticizing tank 45, and the clamp 20 removes the battery case 1A from the fluidizing tank 10, and then places it in the plasticizing tank 45 to be heated by the second electromagnetic induction coil 46. The second electromagnetic induction coil 46 adopts the principle of induction heating to heat the battery case 1A. Induction heating uses the electromagnetic induction method to generate electric current inside the material to be heated (the battery case 1A), and relies on the energy of these eddy currents for heating purposes.

In the above solution, by removing the battery case 1A from the dip-coating powder and heating the battery case 1A again to achieve heating and plasticizing, the insulating film on the surface of the battery case 1A can be made more uniform, and the coating quality of the battery case 1A can be better, so that the battery has higher quality.

According to some embodiments of the present application, the step S13 of removing the battery case 1A from the dip-coating powder and heating the battery case 1A again includes: removing the battery case 1A from the dip-coating powder, and heating the battery case 1A again while vibrating the battery case 1A.

In some embodiments, in the step S13, while heating the surface of the battery case 1A, the battery case 1A can be vibrated through the vibrating portion 23.

In the above solution, during heating and plasticizing, vibrating the battery case 1A can make the insulating film more uniform, thereby effectively improving the quality of the battery.

According to some embodiments of the present application, in the step S13 of removing the battery case 1A from the dip-coating powder and heating the battery case 1A again to melt the insulating film adhered to the surface of the battery case 1A: the heating temperature is M4, and the melting point of the dip-coating powder is M2, where 20° C.≤M4−M2≤100° C.

In the step S13, the heating temperature for the surface of the battery case 1A is M4, and M4 should be greater than the melting point M2 of the dip-coating powder, satisfying the condition 20° C.≤M4−M2≤100° C. For example, when the melting point M2 of the dip-coating powder is 100° C., the value range of M4 is 120° C.≤M4≤200° C., that is, the preheating temperature for the surface of the battery case 1A may be 120° C., 121° C., 122° C., 123° C. . . . 199° C. or 200° C.

In the above solution, in the process of plasticizing the battery case 1A, if the difference between the heating temperature M4 and the melting point M2 of the dip-coating powder is too low, it will not be easy to melt the dip-coating powder on the surface of the battery case 1A. If the difference between the heating temperature M4 and the melting point M2 of the dip-coating powder is too high, however, it will affect the forming quality of the insulating film and easily cause the insulating film to crack. In view of this, the heating temperature M4 is limited in this solution to satisfy the condition 20° C.≤M4−M2≤100° C., ensuring smooth melting of the dip-coating powder on the surface of the battery case 1A to ensure the quality of the insulating film of the battery case 1A.

According to some embodiments of the present application, the step S11 of dipping the battery case 1A in the dip-coating powder includes dipping a plurality battery cases 1A in the dip-coating powder simultaneously.

The step S12 of heating the battery case 1A includes heating a plurality of battery cases 1A simultaneously.

The step S13 of removing the battery case 1A from the dip-coating powder and heating the battery case 1A again includes removing a plurality of battery cases 1A from the dip-coating powder simultaneously and heating the plurality of battery cases 1A simultaneously again.

In the above solution, since the coating of the surface of the battery case 1A is achieved by using the dip coating process, a plurality of battery cases 1A can be coated simultaneously, thereby improving the efficiency of coating of the battery cases 1A and improving the efficiency of manufacturing of the battery.

In some embodiments, the clamp 20 can clamp a plurality of battery cases 1A simultaneously, so that the step S11, step S12 and step S13 can be performed simultaneously.

In the above solution, since the coating of the surface of the battery case 1A is achieved by using the dip coating process, a plurality of battery cases 1A can be coated simultaneously, thereby improving the efficiency of coating of the battery cases 1A and improving the efficiency of manufacturing of the battery.

In some embodiments, after performing the step S13, the method may further include the following step:

S14. placing the battery case 1A in a cooling tank for cooling and solidification.

The cooling tank refers to a component that can cool the surface of the battery case 1A so that the insulating film is cooled and solidified.

In some implementations, before performing the step S11, the method may further include the step of pretreating the surface of the battery case 1A to remove oil stains and other contaminants on the battery case 1A while increasing adhesion of the dip-coating powder. Pretreatment processes that can be used include ultrasonic surface degreasing, degreasing agent wiping, etc.

According to some embodiments of the present application, referring to FIGS. 1 to 6, the present application further provides a coating device. The coating device includes a fluidization tank 10, a clamp 20, a first heating mechanism 30 (the first heating mechanism 30 is not shown in FIGS. 1 to 6) and a second heating mechanism 40 (the second heating mechanism 40 is not shown in FIGS. 1 to 6). The fluidization tank 10 is filled with dip-coating powder. A partition 12 is provided inside the fluidization tank 10 to divide the fluidization tank 10 into a first chamber and a second chamber 13, where the first chamber is below the second chamber 13, and the first chamber and the second chamber 13 are in communication with each other through a plurality of through holes 120 on the partition 12 (the diameter of the through holes 120 is less than or equal to the diameter of the dip-coating powder). The dip-coating powder is arranged in the second chamber 13. The first chamber with the air inlet 11 of the fluidization tank 10. Gas is supplied to the first chamber through the air inlet 11, and the gas enters the second chamber 13 through the through holes 120 on the partition 12 to act on the dip-coating powder, so that the dip-coating powder is in the fluid state. The clamp 20 includes a mounting plate 21, a vibrating portion 23 and a plurality of clamping portions 22. The plurality of clamping portions 22 are provided on the bottom surface of the mounting plate 21. The clamp 20 clamps a plurality of battery cases 1A through a plurality of clamping portions 22 (The clamping portions 22 are provided with a sealing member. When the battery cases 1A are being clamped, the opening of the battery cases 1A is sealed by the sealing member to prevent the dip-coating powder from entering the interior of the battery cases 1A). The vibrating portion 23 is provided on the top surface of the mounting plate 21. The top surface of the mounting plate 21 is also connected to a robotic arm. The robotic arm is used to move the mounting plate 21 so that the plurality of battery cases 1A can be simultaneously moved to the position of the first heating mechanism 30 to be heated, moved to the interior of the fluidization tank 10 to be dipped in the dip-coating powder, and moved to the position of the second heating mechanism 40 to be heated. The vibrating portion 23 functions to vibrate the mounting portion so as to realize vibration of the battery cases 1A.

The first heating mechanism 30 and the second heating mechanism 40 may be a device capable of heating the battery cases 1A, such as a heating furnace, an oven or the like.

The dip-coating powder may be a thermoplastic powder that is resistant to high temperatures and has flame retardant properties. For example, the dip-coating powder is a high-temperature resistant polyethylene thermoplastic powder with a melting point of M2.

Through the coating device provided in this embodiment, the following coating method 100 can be performed accordingly. With reference to FIG. 13, the coating method 100 may be as follows.

First, each battery case 1A is pretreated to remove oil stains and other contaminants on the case, while increasing the adhesion of the powder.

Then the step S1 is performed to preheat a plurality of battery cases 1A simultaneously. In this step, the surface of the battery cases 1A is preheated by the first heating mechanism 30 at the preheating temperature M1, and M1 satisfies the condition 20° C.≤M1−M2≤50° C.

Then the step S2 is performed to dip the plurality of preheated battery cases 1A in the dip-coating powder simultaneously. The residual heat of the battery cases 1A is used to melt the dip-coating powder around the battery cases 1A and adhere it to the surface of the battery cases 1A to form an insulating film. In this step, the vibrating portion 23 operates to vibrate the battery cases 1A.

Then the step S3 is performed to remove the plurality of battery cases 1A from the dip-coating powder simultaneously, and heat the plurality of battery cases 1A simultaneously again through the second heating mechanism 40, so that the insulating film adhered to the surface of the battery cases 1A is melted. In this step, the vibrating portion 23 operates to vibrate the battery cases 1A.

Then the step S4 is performed to place the plurality of battery cases 1A in the cooling tank simultaneously for cooling and solidification.

According to some embodiments of the present application, the present application further provides a coating device, referring to FIGS. 1 to 6 and 8 to 12. The coating device includes a fluidization tank 10, a clamp 20, a first heating mechanism 30, a plasticizing tank 45 and a second heating mechanism 40. The fluidization tank 10 is filled with dip-coating powder. A partition 12 is provided inside the fluidization tank 10 to divide the fluidization tank 10 into a first chamber and a second chamber 13, where the first chamber is below the second chamber 13, and the first chamber and the second chamber 13 are in communication with each other through a plurality of through holes 120 on the partition 12 (the diameter of the through holes 120 is less than or equal to the diameter of the dip-coating powder). The dip-coating powder is arranged in the second chamber 13. The first chamber with the air inlet 11 of the fluidization tank 10. Gas is supplied to the first chamber through the air inlet 11, and the gas enters the second chamber 13 through the through holes 120 on the partition 12 to act on the dip-coating powder, so that the dip-coating powder is in the fluid state. The clamp 20 includes a mounting plate 21, a vibrating portion 23 and a plurality of clamping portions 22. The plurality of clamping portions 22 are provided on the bottom surface of the mounting plate 21. The clamp 20 clamps a plurality of battery cases 1A through a plurality of clamping portions 22 (The clamping portions 22 are provided with a sealing member. When the battery cases 1A are being clamped, the opening of the battery cases 1A is sealed by the sealing member to prevent the dip-coating powder from entering the interior of the battery cases 1A). The vibrating portion 23 is provided on the top surface of the mounting plate 21. The top surface of the mounting plate 21 is also connected to a robotic arm. The robotic arm is used to move the mounting plate 21 so that the plurality of battery cases 1A can be simultaneously moved to the position of the first heating mechanism 30 to be heated, moved to the interior of the fluidization tank 10 to be dipped in the dip-coating powder, and moved to the position of the second heating mechanism 40 to be heated. The vibrating portion 23 functions to vibrate the mounting portion so as to realize vibration of the battery cases 1A.

The first heating mechanism 30 is a first electromagnetic induction coil 31 provided inside the fluidization tank 10. The second heating mechanism 40 is a second electromagnetic induction coil 46 provided inside the plasticizing tank 45.

The dip-coating powder may be a thermoplastic powder that is resistant to high temperatures and has flame retardant properties. For example, the dip-coating powder is a high-temperature resistant polyethylene thermoplastic powder with a melting point of M2.

Through the coating device provided in this embodiment, the following coating method 200 can be performed accordingly. With reference to FIG. 14, the coating method 200 may be as follows.

First, each battery case 1A is pretreated to remove oil stains and other contaminants on the case, while increasing the adhesion of the powder.

Then the step S11 is performed to dip a plurality of battery cases 1A in the dip-coating powder simultaneously.

Then the step S12 is performed to heat the plurality of battery cases 1A simultaneously so that the dip-coating powder around the battery cases 1A is melted and adhered to the surface of the battery cases 1A to form an insulating film. In this step, the surface of the battery cases 1A is heated by the first heating mechanism 30 at the heating temperature M3, which satisfies the condition $5°\ C. \leq M3-M2 \leq 50°\ C.$ In this step, the vibrating portion 23 operates to vibrate the battery cases 1A.

Then the step S3 is performed to remove the plurality of battery cases 1A from the dip-coating powder simultaneously and heat the plurality of battery cases 1A simultaneously again through the second heating mechanism 40, so that the insulating film adhered to the surface of the battery cases 1A is melted. In this step, the vibrating portion 23 operates to vibrate the battery cases 1A.

Then the step S4 is performed to place the plurality of battery cases 1A in the cooling tank simultaneously for cooling and solidification.

Described above are only preferred embodiments of the present application which are not intended to limit the present application. For those skilled in the art, the present application may have various modifications and changes. Any modifications, equivalent substitutions, improvements, etc. made within the spirit and principle of the present application shall fall within the scope of protection of the present application.

What is claimed is:

1. A coating device, comprising:
- a fluidization tank for containing dip-coating powder therein;
- a clamp for clamping a battery case and dipping the battery case into the dip-coating powder in the fluidization tank;
- a first heater for heating the battery case before the battery case is dipped in the dip-coating powder and/or heat the battery case after the battery case is dipped in the dip-coating powder in the fluidization tank so that the dip-coating powder around the battery case is melted and adhered to a surface of the battery case to form an insulating film; and
- a second heater arranged in a plasticizer tank for heating the insulating film of the battery case to melt the insulating film.

2. The coating device according to claim 1, wherein;
- the clamp comprises a mounting plate and a clamping portion, the clamping portion being connected to the mounting plate and used to clamp the battery case; and
- the mounting plate is configured to cover an opening of the fluidization tank.

3. The coating device according to claim 2, wherein:
- the clamping portion has a sealing member for sealing an opening of the battery case;

and/or
- the clamp comprises a plurality of clamping portions for clamping a plurality of battery cases, and the plurality of clamping portions are all connected to the mounting plate;

and/or the clamp further comprises a vibrating portion provided on the mounting plate for vibrating the clamping portion.

4. The coating device according to claim 1, wherein:

the fluidization tank has an air inlet for introducing gas into an interior of the fluidization tank, so that the dip-coating powder is in a fluidized state.

5. The coating device according to claim 4, wherein;

a partition is provided inside the fluidization tank, the partition divides the interior of the fluidization tank into a first chamber and a second chamber along a height direction of the fluidization tank, and the partition has a plurality of through holes to communicate the first chamber with the second chamber, a diameter of the through holes being less than or equal to the diameter of the dip-coating powder; and the air inlet is in communication with the first chamber, and the second chamber is filled with the dip-coating powder.

6. The coating device according to claim 1, wherein the coating device further comprises:

the second heater for heating the battery case to make the surface of the insulating film uniform.

7. The coating device according to claim 6, wherein the coating device further comprises:

the clamp is also used to place the battery case in the plasticizing tank.

8. The coating device according to claim 6, wherein:

the first heater is a first electromagnetic induction coil, the first electromagnetic coil encloses a first cavity for accommodating the battery case, the second heater is a second electromagnetic induction coil, and the second electromagnetic induction coil encloses a second cavity for accommodating the battery case.

9. A coating device, comprising:

a fluidization tank for containing dip-coating powder therein;

a clamp for clamping a battery case and dipping the battery case into the dip-coating powder in the fluidization tank; and a first heater for heating the battery case so that the dip-coating powder around the battery case is melted and adhered to a surface of the battery case to form an insulating film, wherein:

the first heater is located outside the fluidization tank for heating the battery case before it is dipped in the dip-coating powder, and the first heater is located inside the fluidization tank for heating the battery case after it is dipped in the dip-coating powder.

10. The coating device according to claim 9, wherein;

the first heater is a first electromagnetic induction coil, wherein the first electromagnetic induction coil encloses a first cavity for accommodating the battery case.

11. The coating device according to claim 9, wherein the coating device further comprising:

a second heater for heating the insulating film of the battery case to melt the insulating film, the second heater is a second electromagnetic induction coil, and the second electromagnetic induction coil encloses a second cavity for accommodating the battery case.

* * * * *